United States Patent [19]

Tsunefuji et al.

[11] Patent Number: 4,571,049
[45] Date of Patent: Feb. 18, 1986

[54] PHOTOGRAPHIC CAMERA OF MULTIPLE SPOT PHOTOMETRY TYPE

[75] Inventors: Katsuhiko Tsunefuji; Masafumi Yamasaki, both of Hachioji, Japan

[73] Assignee: Olympus Optical Co., Ltd., Tokyo, Japan

[21] Appl. No.: 571,378

[22] Filed: Jan. 16, 1984

[30] Foreign Application Priority Data

Mar. 17, 1983 [JP] Japan .................. 58-45088

[51] Int. Cl.$^4$ .............................................. G03B 7/08
[52] U.S. Cl. ..................... 354/410; 354/412; 354/441; 354/474; 354/479
[58] Field of Search ........... 354/432, 429, 481, 458, 354/456, 479, 480, 412, 441, 474, 410

[56] References Cited

U.S. PATENT DOCUMENTS 4,176,955 12/1979 Yamada et al.
4,306,787 12/1981 Fukuhara et al. ............... 354/432
4,309,091 1/1982 Fukuhara et al. ............... 354/432
4,364,650 12/1982 Terashita et al. ............... 354/432
4,394,078 7/1983 Terashita ........................ 354/432
4,443,080 4/1984 Saegusa ......................... 354/432
4,445,778 5/1984 Nakauchi ....................... 354/432

Primary Examiner—Russell E. Adams
Attorney, Agent, or Firm—Louis Weinstein

[57] ABSTRACT

A photographic camera of the multiple spot photometry type is provided which functions to receive and store information representing the brightness of an object being photographed at desired spots to be determined. A microcomputer applies an arithmetic operation on such information for exposure control or display. When the number of information items representing the brightness of the object exceeds a given number, the latest information is substituted for the oldest information.

12 Claims, 23 Drawing Figures

PHOTOGRAPHIC CAMERA OF MULTIPLE SPOT PHOTOMETRY TYPE

BACKGROUND OF THE INVENTION

The invention relates to a photographic camera of the multiple spot photometry type, and more particularly, to such a camera including photometric means with storage which successively samples and stores information relating to the brightness of an object being photographed at a plurality of desired spots.

As is well recognized, the photometry used in a camera can be categorized into an average photometry and a partial or spotwise photometry. The average photometry provides an average determination of the brightness of an object being photographed over a relatively broad area, and almost all of the usual cameras employ this technique since it produces a passable result for taking a picture of a common object. By contrast, the partial or spotwise photometry determines a the brightness of a restricted area of the object being photographed in a spotwise manner, and is effectively utilized when controlling the amount of exposure in accordance with a selected area of the object exhibiting a high contrast. However, it requires a troublesome operation, and may disadvantageously result in a picture being taken with an improper exposure. Accordingly, when taking a picture of a common object, it can be said that the average photometry is superior to the spotwise photometry.

However, it will be noted that while there are objects being photographed which exhibit a low contrast, in practice, there are a number of objects exhibiting higher contrasts such as objects in the rear light, objects on a stage, or objects in the outdoors as viewed through a window when a particular composition is desired. In particular, the chance to take pictures of objects exhibiting a higher contrast increases with the skill of a photographer. If an object being photographed which exhibits a high contrast is taken with a photographic camera which utilizes the average photometry technique, the exposure will be controlled in accordance with the average brightness of the object, and cannot fully reflect the intent of a photographer for the photographic composition which would be achieved by controlling the exposure in accordance with the brightness of a selected area of the object.

A photographic camera of multiple spot photometry type has already been proposed which includes spotwise photometric means with storage for determining, at any time desired, and storing brightness of selected spots on an object being photographed which exhibits a high contrast. With such a camera, it is possible to perform an arithmetic operation on a plurality of spotwise brightness values stored in order to determine an exposure level in accordance with the result of such calculation. This allows a photographer to choose an exposure control which fully reflects his intention. However, a camera of this kind has a limited storage capacity, which prevented the entry of further spotwise values after a given number of such values have been entered. Consequently, if an entry operation is made, an associated display which indicates the result of an arithmetic operation remains unchanged, causing a photographer to recognize mistakenly that a failure has occurred within the camera. Another shortcoming is the fact that old data remains saved and can only be cancelled by clearing all data that has been stored, resulting in an inconvenience of updating data. In short, there remains a problem in respect of the reasonableness of an arrangement for affording an exposure control which is based on the result of an arithmetic operation performed using latest multiple spot photometry information.

SUMMARY OF THE INVENTION

In view of the foregoing, it is an object of the invention to provide a photographic camera of the multiple spot photometry type which enables information relating to the brightness of an object being photographed at a plurality of desired spots to be successively entered and stored and in which whenever the number of entries exceeds a limit, any fresh brightness information entered replaces old information, thus maintaining the latest brightness information to enable an arithmetic operation over the multiple spots of the photometry.

In accordance with the invention, photometric means with storage determines the brightness of an object being photographed at a desired spot, and enters information relating thereto at any time desired. When the number of entries exceeds a limit, all the brightness information is replaced by latest or fresh brightness information, thus allowing information to be updated in a circulating manner. Accordingly, a result of arithmetic operation or an exposure value which is displayed on the basis of multiple spot photometry is updated each time fresh brightness information is entered. This also avoids the likelihood that a photographer may mistakenly recognize a certain display content for a failure of the camera.

DESCRIPTION OF PREFERRED EMBODIMENT

Figure 1:
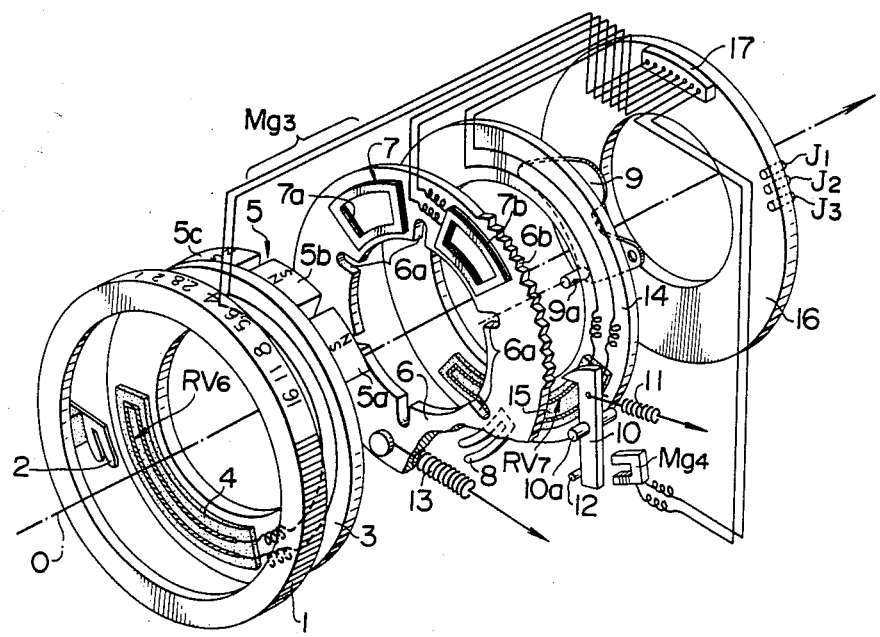
FIG. 1 is a perspective view of one form of an electromagnetic diaphragm mechanism disposed within a lens barrel of a photographic camera of multiple spot photometry type according to the invention.

FIG. 1 shows an electromagnetic diaphragm mechanism disposed within a lens barrel which is adapted to be detachably mounted to a body of a photographic camera of the multiple spot photometry type according to the invention. Referring to FIG. 1, a diaphragm ring 1 is rotatably carried within a lens barrel, not shown, and fixedly carries a sliding electrical contact 2 on its inner end face. The contact 2 is disposed for sliding contact with a resistor formed on a substrate 4, the combination of the contact 2 and the resistor forming together a variable resistor RV6. The purpose of the variable resistor RV6 is to introduce into camera a value ΔAV representing a stop-down value or the degree the diaphragm aperture is to be decreased from its open condition as the diaphragm ring 1 is rotated to establish a particular diaphragm aperture during a diaphragm preset or aperture priority automatic photographing mode. The substrate 4 is fixedly mounted on an end face of a yoke 3 formed of a magnetizable material and secured to the lens barrel, the end face facing the electrical contact 2. Fixedly mounted on the other end face of the yoke 3 are an array 5 of permanent magnets which are shown as permanent magnets 5a, 5b, 5c, . . . in orientations as shown, namely, the N- and S-poles of adjacent magnets being opposite to each other. A diaphragm blade drive ring 6 is rotatably disposed within the lens barrel rearwardly or to the right, as viewed in FIG. 1, of the yoke 3. Disposed on the surface of the ring 6 which faces the permanent magnets 5a, 5b, 5c is an array 7 of coils 7, which are shown as coils 7a, 7b, . . . while a sliding electrical contact 8 is secured to the other side of the ring 6. The combination of the permanent magnets 5 and the coils 7 forms together a diaphragm controlling electromagnet Mg3 to be described later in connection with FIG. 3.

The drive ring 6 is formed with a central opening, and a plurality of radially extending notched grooves 6a are formed in the edge of the opening. As is well known, a drive pin 9a fixedly mounted on a diaphragm blade 9 (only one being shown) is fitted into the notched groove 6a. One end of the diaphragm blade 9 is pivotally mounted on a stationary member integral with the lens barrel, and hence the blade 9 rocks around the pivot to define a diaphragm aperture as the drive ring 6 rotates. Along part of its outer periphery, the drive ring 6 is formed with a gear 6b, to the right of which is disposed a mating member 10 in opposing relationship with the periphery of the drive ring for engaging the gear 6b to halt the rotation of the drive ring 6. The mating member 10 is pivotally mounted at 10a on the lens barrel and is urged by a spring 11 to rotate clockwise. Thus it is normally urged to abut against a stop 12 where its mating pawl is out of engagement with the gear 6b. A solenoid Mg4 (see FIG. 3) is disposed adjacent to a portion of the mating member 10 which is located adjacent to the stop 12. When energized, the electromagnet Mg4 causes the mating member 10 to rotate angularly against the resilience of the spring 11 to hold its lower end attracted thereto, thus maintaining the mating pawl in engagement with the gear 6b on the drive ring 6, thus halting the rotation of the drive ring 6. It is also to be noted that the drive ring 6 is urged by a spring 13 to rotate counter-clockwise about an optical axis O, whereby it normally maintains the diaphragm blades in their fully open position.

Disposed rearwardly or to the right, as viewed in FIG. 1, of the drive ring 6 is a yoke 14 of a magnetizable material which is secured to the lens barrel. On its surface facing the electrical contact 8, the yoke 14 carries a resistor substrate 15 carrying a resistor thereon which is disposed in sliding contact with the electrical contact 8. In this manner, a variable resistor RV7 is formed which derives a value AVC representing an actual diaphragm aperture change. Specifically, as the drive ring 6 is rotated clockwise against the resilience of the spring 13 to control the diaphragm aperture or to effect the stop-down, the resistance of the variable resistor RV7 changes in accordance with such rotation, thus varying the actual diaphragm change value AVC.

A lens mount 16 is located at the rear end of the lens barrel, and carries a connector 17 on its rear end face. Lead wires extending from the variable resistors RV6, RV7, the coils 7a, 7b, . . . and the electromagnet Mg4 are connected to the connector 17 for connection with an electrical circuit disposed within the camera body whenever the lens barrel is mounted on the camera body by mating it with a corresponding connector, not shown, mounted on the camera body. Electrical contacts J1, J2 and J3 project from the lens mount 16 toward the camera body for transmitting an open diaphragm aperture value AVO of the lenses within the lens barrel to the camera body. These contacts are connected to the body as the ground, and a selected combination of the presence or absence of the three contacts J1 to J3 is determined in accordance with the open diaphragm value AVO, permitting seven values to be transmitted to the camera body.

Figure 2:
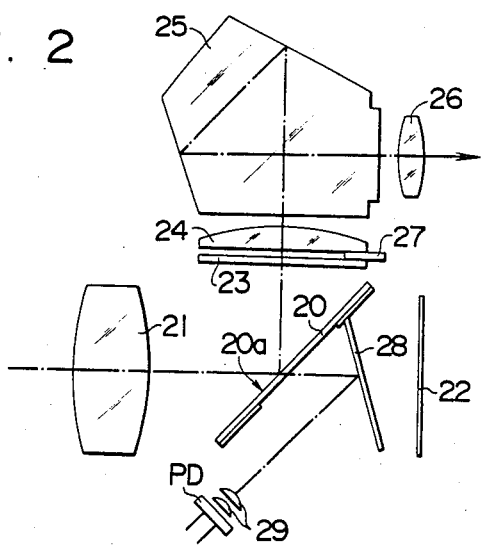
FIG. 2 is a schematic view illustrating an optical system disposed within the camera of the invention.

FIG. 2 shows an optical system of the photographic camera according to the invention which is arranged as a single lens reflex camera. As is well recognized, the optical system of a single lens reflex camera includes a movable reflection mirror 20 which is rotatably disposed and which is normally oriented at an angle of 45° with respect to a taking light path. When the mirror is located at this orientation, it defines a finder optical path, and light from an object being photographed which impinges into the camera through a taking lens 21 is reflected upward at right angles for incidence into a finder optical system. The finder optical system includes a focussing glass 23 which is located to be optically conjugate to a photosensitive surface of a photographic film 22, a condenser lens 24 disposed directly over the focussing glass 23, a pentaprism 25 disposed immediately above the condenser lens 24, and a finder eyepiece 26 disposed to be opposite to the rear end face of the pentaprism 25 which represents a light exit end face. Photographing information display 27 comprising a liquid crystal display panel of light transmission type, to be described later, is disposed between the focussing glass 23 and the condenser lens 24 toward their rear ends. The movable mirror 20 is centrally formed with a half-silvered surface 20a, and a totally reflecting mirror 28 is disposed on the backside of the movable mirror 20 in a region corresponding to the half-silvered surface 20a so as to define a given angle with respect to the movable mirror 20 and so as to be movable. The totally reflecting mirror 28 reflects light which has passed through the half-silvered surface 20a of the movable mirror 20 toward the bottom of the camera for incidence upon a light receiving element PD, which is used for spotwise photometry, through a bank of condenser lenses 29.

Figure 3:
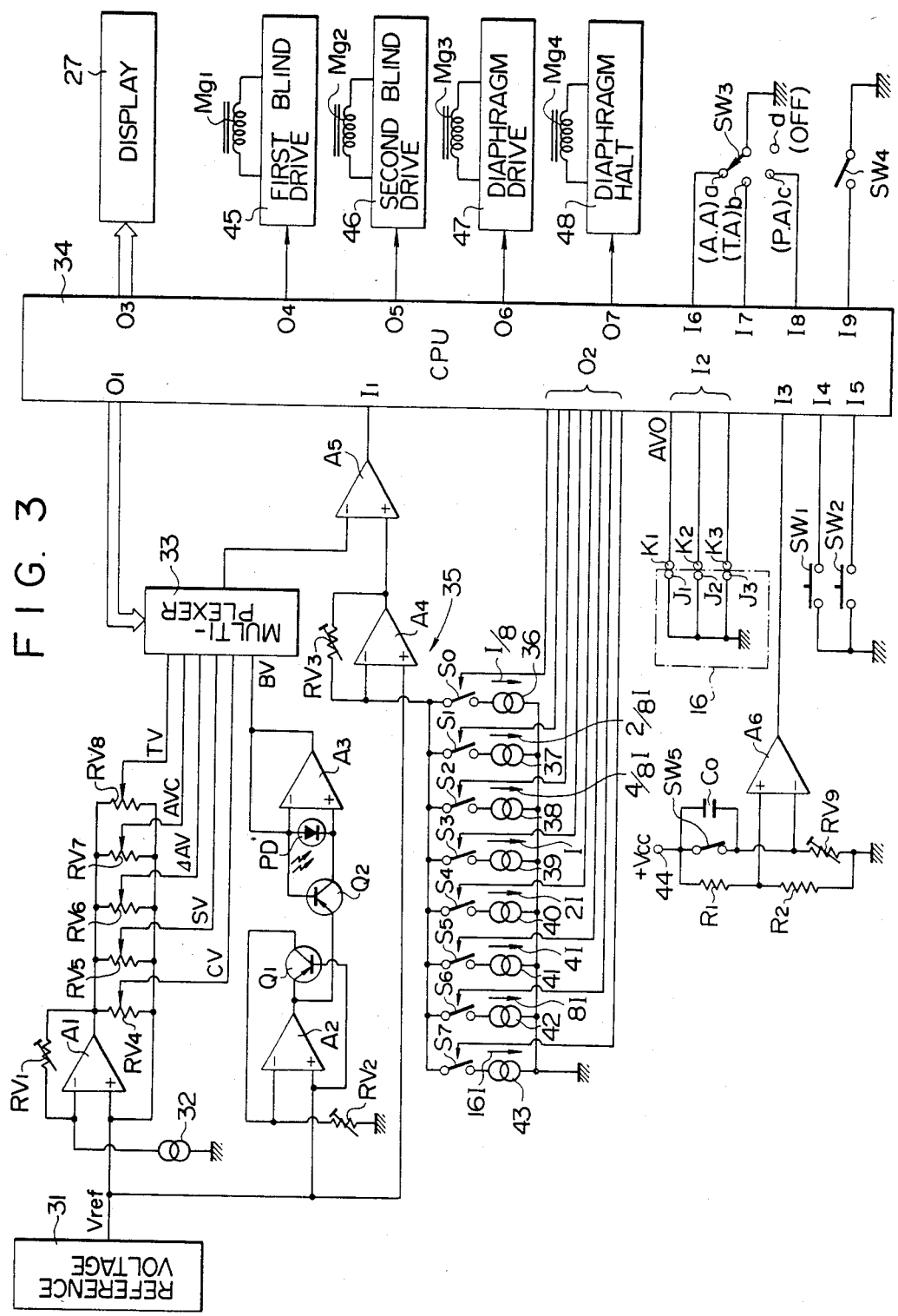
FIG. 3 is a circuit diagram of an electrical circuit in the camera of the invention.

FIG. 3 is a circuit diagram of an electrical circuit which is incorporated into the photographic camera of the invention. In this Figure, a reference voltage circuit 31 produces a reference voltage Vref at its output terminal which is connected to a non-inverting input terminal of each of operational amplifiers A1, A2 and A4. The inverting input terminal of the amplifier A1 is connected to the ground through a constant current source 32 and is also connected to the output thereof through a semi-fixed resistor RV1 which is utilized to regulate the magnitude of the reference voltage Vref for purpose of introducing a variety of photographing information. Connected in shunt with each other between the output terminal and the non-inverting input terminal of the amplifier A1 are a variable resistor RV4 which introduces an exposure correction value CV, a variable resistor RV5 which introduces a film speed value SV, the variable resistor RV6 (see FIG. 1) which introduces stop-down value $\Delta AV$ from the open aperture, the variable resistor RV7 (see FIG. 1) which introduces the actual aperture change AVC and a variable resistor RV8 which introduces a shutter period value TV. It is to be noted that a movable slider on each of these variable resistors RV4 to RV8 is connected to a corresponding input terminal of a multiplexer 33 which comprises a plurality of analog switches.

The inverting input terminal of the amplifier A2 is connected to the ground through a semi-fixed resistor RV2 which is utilized to regulate a brightness value BV of an object being photographed which is subject to a spotwise photometry, and also connected to the collector of a PNP transistor Q1. The transistor Q1 has its emitter connected to the output terminal of the amplifier A2 and its base connected to the non-inverting input terminal thereof. The output terminal of the amplifier A2 is also connected to the emitter of a PNP transistor Q2, the collector and base of which are connected to the non-inverting and the inverting input terminal respectively of an operational amplifier A3. Connected between the inverting and the non-inverting input terminal of the amplifier A3 is the light receiving element PD (see FIG. 2) used for the spotwise photometry, with its anode connected to the inverting input terminal. The inverting input terminal of the amplifier A3 is connected to the output terminal thereof, which is in turn connected to a corresponding input terminal of the multiplexer 33 which is used to enter spotwise brightness information.

As mentioned previously, the multiplexer 33 comprises a plurality of analog switches. Applied to its six input terminals are an output voltage from the amplifier A1 as modified by the variable resistor RV4 to define a correction value CV, as modified by a variable resistor RV5 to define a film speed value SV, as modified by the variable resistor RV6 to define a stop-down value $\Delta AV$ from the open aperture, as modified by the variable resistor RV5 to define an actual aperture change AVC, and as modified by the variable resistor RV8 to define a shutter period value TV as well as an output voltage from the amplifier A3 which corresponds to a spotwise brightness value BV. The multiplexer 33 functions to output one of six inputs selectively, and to this end, has a control input which is connected to an output port O1 of a central processing unit (hereafter abbreviated as CPU) comprising a microcomputer. The output terminal of the multiplexer 33 is connected to an inverting input terminal of a comparator A5 which forms an A/D conversion circuit of sequential comparison type together with a D/A converter 35.

The D/A converter 35 comprises the operational amplifier A4, a semi-fixed resistor RV3 for adjusting an output level from the converter 35, a plurality of analog switches S0 to S7 which are turned on and off in response to commands from CPU 34, and a plurality of reference current sources 36 to 43 which are connected to the analog switches S0 to S7, respectively. Specifically, the noninverting input terminal of the amplifier A5 is connected to the output terminal of the operational amplifier A4, with a semi-fixed resistor RV3 connected between the output terminal and the inverting input terminal of the amplifier A4. Connected to the inverting input terminal of the amplifier A4 are one end of each of the analog switches S0 to S7, the other end of which is connected to the ground through one of reference current sources 36 to 43, respectively. Each of the switches S0 to S7 has a control input terminal which is connected to one of output ports O2 of CPU 34 so as to be turned on and off in accordance with commands fed from the latter. The current sources 36 to 43 are designed to produce reference currents having magnitudes of I/8, 2I/8, 4I/8, I, 2I, 4I, 8I and 16I, respectively. Accordingly, as the switches S0 to S7 are selectively turned on or off by commands from CPU 34 weighted current flows through each of the switches S0 to S7. The output terminal of the comparator A5 is connected to an input port I1 of CPU 34.

Three electrical contacts K1 to K3 disposed on a mount (not shown) on the camera body for connection with the electrical contacts J1 to J3 on the lens mount 16 (see FIG. 1) when the lens barrel is mounted on the camera are connected to input ports I2 of CPU 34 which are used to introduce an open aperture value AVO of the lens assembly within the lens barrel.

A normally closed trigger switch SW5 is adapted to be opened during the initial phase of running of a first shutter blind when a shutter release takes place, thus detecting the initiation of an exposure process. The switch SW5 is connected in a trigger delay circuit including a comparator A6. The switch SW5 has its one end connected to a terminal 44, to which the supply voltage +Vcc is applied while the other end of the switch SW5 is connected to the inverting input terminal of the comparator A6 and also connected to the ground through a semi-fixed resistor RV9 which is used to adjust a trigger delay time. A capacitor C0 is connected in series with the resistor RV9 and forms a time constant circuit together with the resistor RV9. Resistors R1 and R2 are connected in series between the terminal 44 and the ground, with the junction therebetween being connected to the non-inverting input terminal of the comparator A6. The output terminal of the comparator A6 is connected to an input port I3 of CPU 34. CPU 34 also includes an input port I4 connected to one end of a normally open spotwise entry switch SW1 of self-resetting type which is mechanically interlocked with the depression of a spotwise entry button, not shown, which is externally provided on the outside of the camera for ease of operation, the other end of the switch SW1 being connected to the ground. Also CPU 34 includes an input port I5 connected to one end of a normally open clear switch SW2 of self-resetting type which is mechanically interlocked with the depression of a clear button, not shown, which is externally provided on the outside of the camera for ease of operation, the other end of the switch SW2 being connected to the ground. The purpose of the clear switch SW2 is to clear any information which is stored within CPU 34 as a result of the closure of the spotwise entry switch SW1.

CPU 34 has an output port O3 connected to an input of photographing information display 27 which comprises a liquid crystal display panel as mentioned previously. CPU 34 has an output port O4 connected to an input of a first shutter blind drive circuit 45 including an electromagnet Mg1 which is effective to constrain a first shutter blind from running. CPU 34 has an output port O5 connected to an input of a second shutter blind drive circuit 46 including an electromagnet Mg2 which is effective to constrain a second shutter blind from running. CPU 34 has an output port O6 connected to an input of a diaphragm drive circuit 47 including the electromagnet Mg3 mentioned above which is used to control the diaphragm aperture. Finally, CPU 34 has an output port 07 connected to an input of a diaphragm halt circuit 48 including the electromagnet Mg4 mentioned above which is effective to halt the diaphragm. It will be noted that the electromagnet Mg3 is formed by a combination of the permanent magnets 5 and the coils 7 contained in the electromagnetic diaphragm mechanism shown in FIG. 1 while the electromagnet Mg4 is effective to halt the rotation of the diaphragm blade drive ring 6 mounted on the electromagnetic diaphragm mechanism shown in FIG. 1, by holding the mating member 10 attracted thereto.

CPU 34 also includes input ports I6, I7 and I8 which are connected to different contacts of a photographing mode selection switch SW3 having its movable contact connected to the ground. Specifically, the input port I6 is connected to a contact a which enables an aperture-priority automatic photographing mode (hereafter abbreviated as A.A mode), the input port I7 is connected to a contact b which enables a shutter speed priority automatic photographing mode (hereafter abbreviated as T.A mode), and the input port I8 is connected to a contact c which enables a programmed automatic photographing mode (hereafter abbreviated as P.A mode). The switch SW3 also includes a floating contact d which is left without connection. CPU 34 also includes an input port I9 connected to one end of a release switch SW4, the other end of which is connected to the ground. The release switch SW4 is adapted to be closed during the initial phase of the upward movement of the movable reflecting mirror 20 in response to the depression of a shutter release button, not shown, and to open at the end of the downward movement of the mirror. It is to be understood that each of the input ports I1 to I9 of CPU 34 includes a pullup resistor (not shown), whereby the application of a signal to a particular one of the input ports I1 to I9 causes a change in the level of such port from "1" to "0".

Figure 4:
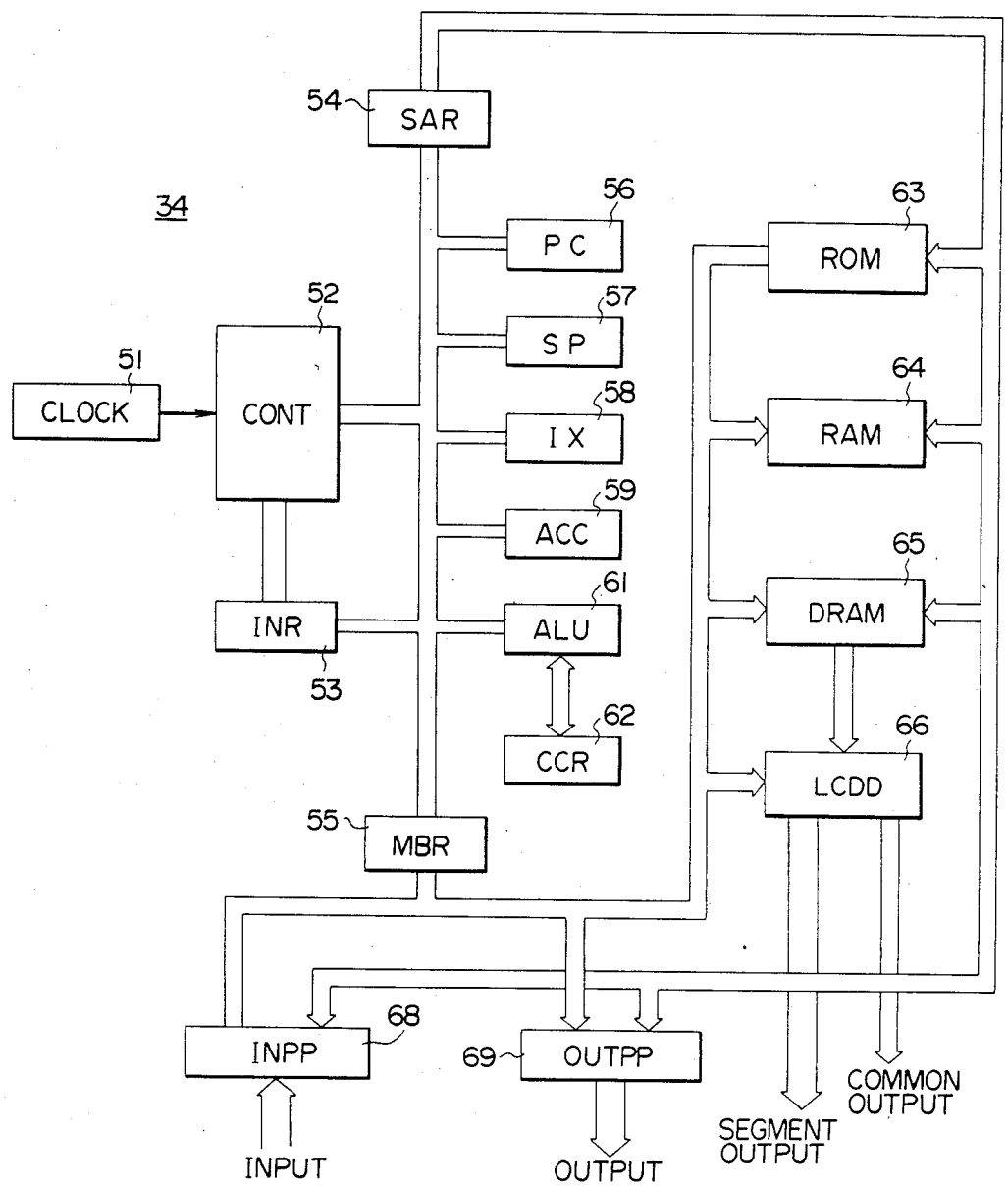
FIG. 4 is a block diagram, showing the internal arrangement of a microcomputer which is used as a central processing unit shown in FIG. 3.

FIG. 4 is a block diagram of CPU 34 which represents the heart of a control system used in the photographic camera of multiple spot photometry type according to the invention, principally illustrating the general arrangement thereof. In this Figure, a clock generator (CLOCK) 51 produces a pulse which is used as a reference in the operation of CPU 34. A control circuit (CONT) 52 controls the overall operation of CPU 34. It is necessary that CPU 34 sequentially transfers and processes various binary data according to a predetermined programmed sequence. To this end, it is necessary to determine when gates within CPU 34 are to be opened and the duration during which they are to be opened and which flipflops are to be set or reset depending on the internal status of CPU 34 as well as its input status. Such function is undertaken by CONT 52.

An instruction register (INR) 53 temporarily stores the content read from a random access memory (RAM) 64 to be described later, and CONT 52 determines the status of various parts of CPU 34 according to the content of INR 53. A program counter (PC) 56 stores the address of an instruction to be executed next in order to follow a program in a proper sequence. It is to be noted that the addresses sequentially increment by one in the sequence of the execution, starting from a smallest address to a highest address within the memory. A stack pointer (SP) 57 temporarily stores the content of PC 56, an accumulator (ACC) 59 to be described later, and an index register (IX) 58 to be described later, without destroying the content thereof in the event an interrupt instruction or a transfer instruction to a subroutine occurs, for re-use of such content after returning from such instruction. The index register IX 58 stores the address of an instruction when executing an instruction in the form of an index address. An arithmetic and logical circuit (ALU) 61 executes those portions of an instruction relating to an arithmetic and logical operation, including addition, substrastion inversion, or forming a logical sum or logical product.

A condition code register (CCR) 62 stores a code as a flag which is used in detecting the status when executing an instruction such as a branch instruction which requires a decision. A decision represents a significant function of CPU 34, and as will be further described later, during the control of the photographic camera of the invention, a branch instruction occurs frequently which requires a decision to see the status, either "1" or "0", of each input port in order to change the flow of the program to be executed next or to follow the program without change. This takes place by determining the flag stored in CCR 62. CCR 62 stores a plurality of flags, including a negative flag which is equal to "1" when a result of executing an instruction becomes negative in 2's complement form and equal to "0" otherwise; a zero flag which is equal to "1" when the result is "0" and equal to "0" otherwise; an overflow flag which is equal to "1" when the result produces an overflow from a 2's complement and equal to "0" otherwise; a carry flag which is equal to "1" when the result of an arithmetic operation produces a carry or borrow from a binary number without sign and equal to "0" otherwise. When an address where a read-out is to be performed is supplied to a storage address register (SAR) 54 and a command to read a memory is given, a memory buffer register (MBR) 55 receives the content of that address.

A read only memory (ROM) 63 is used to allow CPU 34 to read its content sequentially in order to execute instructions. A random access memory (RAM) 64 is used to provide a temporary storage of values obtained in the course of an arithmetic operation or a result thereof or a variety of input information. A display random access memory (DRAM) 65 has a plurality of areas which are arranged in one-to-one correspondence to each of segments of a liquid crystal display panel which forms the photographing information display 27 (see FIGS. 3 and 5 to 14). The arrangement is such that when the content at a specific address of DRAM 65 is equal to "1", a corresponding segment of the display panel is illuminated. A liquid crystal driver (LCDD) 66 drives the display 27 in a divided form, and includes a plurality of segment lines and a common line. An input port unit (INPP) 68 includes the nine input ports I1 to I9 mentioned previously, and an output port unit (OUTPP) 69 includes the seven output ports 01 to 07 mentioned previously (see FIG. 3). It is to be noted that an output from OUTPP 69 represents a latched output.

A sequential control by CPU 34 will now be described briefly. It is to be understood that CPU 34 repeats a pair of cycles, including a fetch cycle which loads an instruction stored within a memory at an address specified by PC 56 and an execute cycle in which that instruction is executed. Initially, a value stored in PC 56 is transferred into SAR 54. Simultaneously, PC 56 now stores the previous content thereof to which "1" is added. When an address where a read operation is to take place is fed to SAR 54, a read instruction to the memory is issued. After a given time delay, the content of the specified address is read into MBR 55. The instruction code portion of that content is transferred into INR 53. This represents a fetch cycle, which is then followed by an execute cycle. It is to be noted that the operation which takes place during the execute cycle depends on the content of INR 53.

By way of example, it is assumed that an instruction (LDA) which requires loading the content of a memory into ACC 59 is stored in INR 53. An address portion of the instruction which remains in MBR 55 is transferred to SAR 54, followed by a read instruction. After a given time interval, data which is obtained in MBR 55 is transferred to ACC 59, thus completing the execution of the instruction. By way of another example, the execution of a conditional branch instruction, which frequently appears within flowcharts to be described later, will be considered. When a conditional branch requires a decision of the status of one of input ports, which is assumed to be a port A, the content of the port A is read into MBR 55 during the fetch cycle in the same manner as mentioned above. It is assumed that the bit from the port A represents the most significant bit within the memory. Assuming that an LDA instruction which requires loading the content of the memory into ACC 59 is stored in INR 53, the content of the port A is transferred to ACC 59, in a manner similar to that described above in connection with the above example. PC 56 then specifies an address of an instruction which is to be executed next, and this instruction is similarly stored in MBR 55. If it is assumed that an ROL instruction which requires shifting the most significant bit of ACC 59 to the carry flag of CCR 62 is stored in INR 53, the status of the port A, either "0" or "1", is stored in the carry flag during the following execute cycle. Then, a BCS instruction is executed which determines the status of the carry flag to make a branch if the carry flag is equal to "1", and to follow the program otherwise, thus accomplishing what is intended. In the latter example, three instructions including LDA, ROL and BCS instructions have been used; but any combination of as many as several tens of instructions may be used to achieve a desired control.

Flowcharts shown in FIGS. 15 to 22 and described later do not indicate the specific use of individual blocks shown in FIG. 4 in terms of machine language level in order to execute various programs, but it will be noted that transfers, additions, subtractions or like operations which appear in the programs can be simply implemented in known manners.

FIGS. 5 to 14 show different manners of display produced by the photographing information display 27. As mentioned previously, the display 27 is formed by a liquid crystal display panel which is well known in itself, and includes a horizontal array of aperture electrodes from "16" to "1.4", another horizontal array of exposure period electrodes from "2000" to "1" and to "4" (electrodes from "2000" to "1" corresponding to shutter periods ranging from 1/2000 to one second), a linear horizontal array of rectangular segment electrodes disposed directly above the exposure period electrodes and providing a bar display, a horizontal array of diamond-shaped segment electrodes disposed directly above the segment electrodes and providing a point display, and a pair of correction electrodes "+" and "−" disposed in alignment with the right-hand end of the aperture electrodes. It should be understood that each of the electrodes is formed by a transparent electrode, whereby the display 27 is of a light transmission type. The segment electrodes which provide a bar display indicates an exposure period or a diaphragm aperture corresponding to an arithmetic mean of spotwise brightness values which are entered while each of the segment electrodes which provide a point display indicates an exposure period or a diaphragm aperture which corresponds to each spotwise brightness value. The segment electrodes which provide a point display as well as the segment electrodes which provide a bar display are adapted to indicate a shutter or exposure period during A.A mode (see FIGS. 5 to 8), a diaphragm aperture during T.A mode (see FIGS. 9 to 11) and a combination of an exposure period and a diaphragm aperture (see FIGS. 12 to 14) which is determined by a programmed diagram (see FIG. 23) during P.A mode.

It is to be noted that each of the electrodes has a memory within DRAM 65 (see FIG. 4) associated therewith in one-to-one correspondence, as mentioned previously, and a voltage is selectively applied to a particular electrode in accordance with a content of such memory in order to provide a display of an exposure period value or diaphragm aperture value, or a bar or a point display of exposure period value TV or diaphragm aperture value AV. In this manner, every display provided by the display 27 represents a latched display, and accordingly once a particular segment is displayed, the display of that segment is not cleared unless the content of a corresponding memory is changed.

The operation of the photographic camera of multiple spot photometry type according to the invention will now be described with reference to flowcharts shown in FIGS. 15 to 22. It is to be understood that in these flowcharts, MX (where X represents an arbitrary letter or numeral) represents a memory address, (MX) represents the content of a memory at an address MX, and the symbol "←" represents a transfer operation. By way of example, "MN ←0" means that "0" is stored in a memory at an address MN. "M7 ←(M1)" means that the content of a memory at an address M1 is transferred to a memory at an address M7.

Initially when the power supply to the camera is turned on, the electrical circuit shown in FIG. 3 is energized. CPU 34 initiates its program from a mode determining flowchart shown in FIG. 15, initializing various flags and memories. First, "0" is stored in a spotwise entry detecting flag MS to initialize it in order to allow the recognition of whether the spotwise entry switch SW1 has been updated. "0" is then stored in a number of spotwise entries memory MN to initialize it. A mode detecting memory MC which stores a value corresponding to each of automatic photographing modes is initialized by storing "0" therein.

By seeing if I5=0, it is determined whether the clear button has been operated. If the clear button has been operated and the clear switch SW2 is turned on, it follows that I5=0. Accordingly, an exit is made through YES (which is abbreviated by Y in the drawings) from this decision block, and after storing "0" in the memory MN, a decision is made to see if which one of photographing modes has been selected. Conversely, if the clear button has not been operated and the clear switch SW2 remains off, it follows that I5≠0. Hence an exit is made through NO (which is abbreviated as N in the drawings) from this decision block, immediately followed by the decision of various photographing modes. The decision to see which one of the photographing modes has been selected is made in the sequence of a decision to see if I6=0 which indicates the selection of A.A mode if yes, a decision to see if I7=0 which indicates the selection of T.A mode if yes, and a decision to see if I8=0 which indicates the selection of P.A mode if yes. Accordingly, if after the power on, the mode selection switch SW3 remains on on its "OFF" contact d without changing to any automatic photographing mode, the program makes an exit through NO from each of decision blocks of I6=0, I7=0 and I8=0, thus turning the display 27 off. Subsequently, it returns through ①—① to a point after the initialization in the flowchart of FIG. 15. Thus, if the selection switch SW3 remains off, the display 27 is not activated after the power on, and the microcomputer loops around ①—①, effecting a mode decision alone with a reduced power dissipation. The operation which occurs when each of the automatic photographing modes has been selected will now be described separately.

Figure 5:
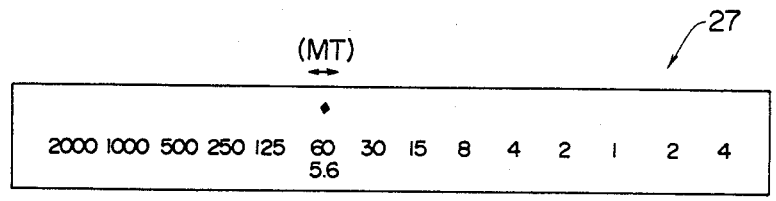
FIGS. 5 to 14 are schematic, enlarged front views of the photographing information display shown in FIG. 2, illustrating various manners of display.
Figure 16:
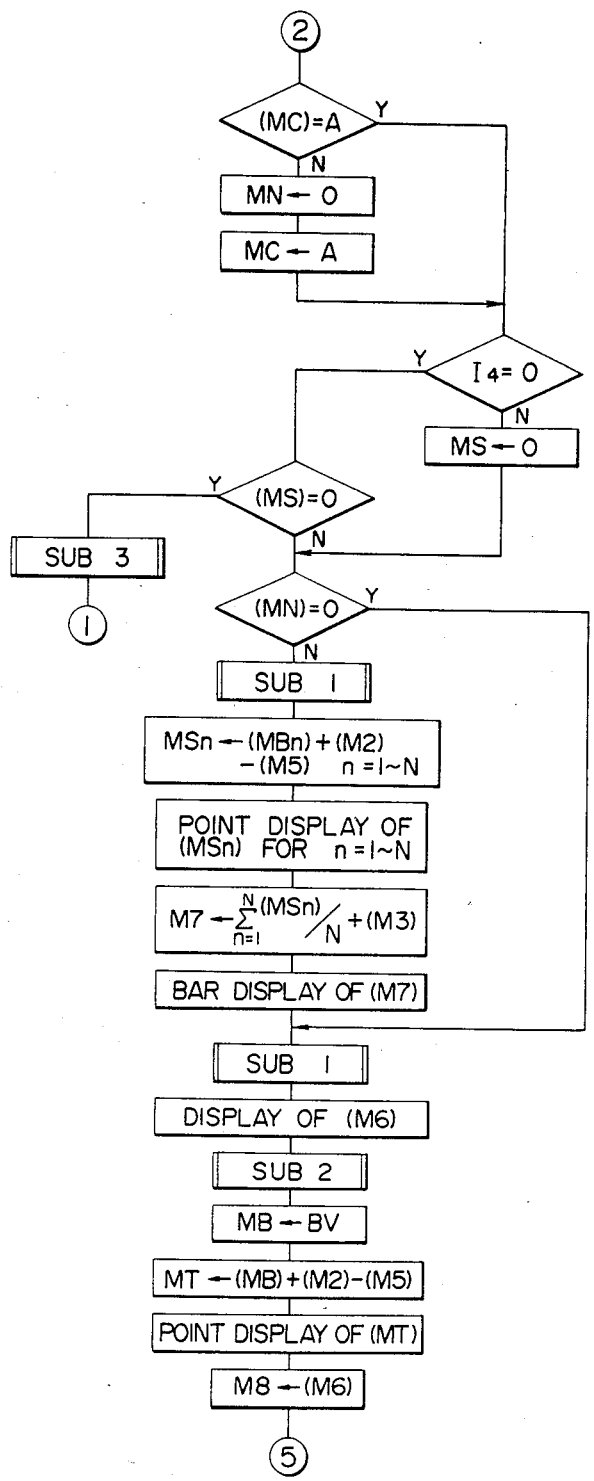

(A) When A.A (aperture priority automatic photographing) mode is selected:

When the mode selection switch SW3 is thrown to the contact a for A.A mode, an exit is made through YES from the decision block of I6=0, branching through ②—② to the flowchart for A.A mode shown in FIG. 16. When the mode selection switch SW3 is thrown to select the A.A mode, the display 27 initially provides a basic display though a flowchart therefor is not shown. The basic display displays indices "2000" to "4" for exposure periods as indicated in FIG. 5.

In the flowchart for the A.A mode, a decision is initially made to see if (MC)=A. "A" represents a numerical value which is specific to the A.A mode. If the content (MC) of the mode detecting memory MC is not equal to "A", it is determined that the A.A mode has just been selected, thus making an exit through NO from the decision block of (MC)=A. "0" is stored in the number of spotwise entries memory MN, followed by storing "A" in the memory MC. During a second pass after "A" has been stored in the memory MC, an exit is made from the decision block through YES. When "A" is stored in the memory MC or after it is confirmed that "A" is stored in a memory MC, a decision to see if I4=0 is made to determine if the spotwise entry switch SW1 is turned on. If the entry switch SW1 is not turned on, an exit is made through NO from this decision block, and after storing "0" in the flag MS, a decision is made to see if the content (MN) of the memory MN is equal to "0". If the number of spotwise entries (MN) made through the spotwise entry switch SW1 is equal to 0, an exit is made through YES from the decision block of (MN)=0, then moving to a subroutine SUB1 to introduce various photographing information.

Figure 20:
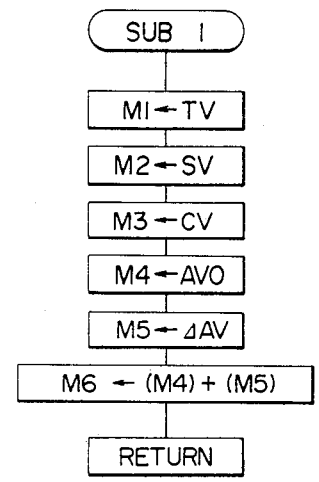

The subroutine SUB1 is shown in FIG. 20 where it will be noted that a preset exposure period value TV is fed to a memory M1, a film speed value SV is fed to a memory M2, a correction value CV is fed to a memory M3, an open aperture value AVO is fed to a memory M4, and a preset stop-down value ΔAV from the open aperture is fed to a memory M5, respectively. The entry of such photographing information is performed in the electrical circuit of FIG. 3 by deriving at the output terminal of the multiplexer 33 voltages corresponding to the values TV, SV, CV and ΔAV, respectively, and converting such voltages into a corresponding digital quantity for sequential input to the input port I1 through the operation of the A/D conversion circuit of sequential comparison type, formed by the D/A converter 35 and the comparator A5. The entry of the open aperture value AVO is made to the input ports I2.

Figure 21:
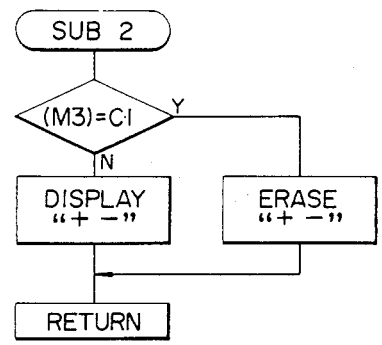
Figure 22:
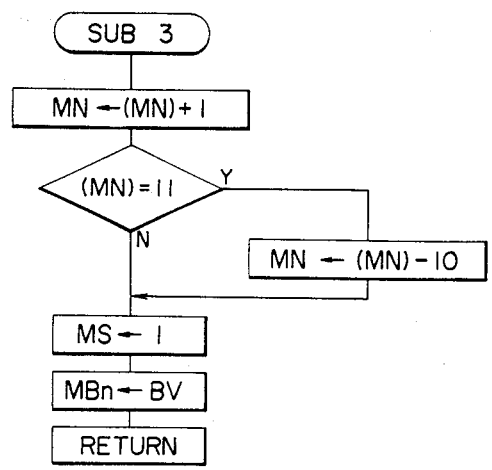

Subsequently, the open aperture value AVO stored in the memory M4 and the preset stop-down value ΔAV which is stored in the memory M5 are used in an Apex calculation for {(M4)+(M5)}, the result of which (AV) is stored in a preset aperture save memory M6. The program then returns to the flowchart shown in FIG. 16. The preset aperture value AV (M6) which is stored in the memory M6 is then displayed. For example, assuming that the preset aperture value (M6) is equal to 5.6, the display 27 indicates only the aperture index "5.6" as indicated in FIG. 5. The program then proceeds to a subroutine SUB2 where a decision is made to see if a correction for the exposure factor is required. This subroutine is shown in FIG. 21 where it will be seen that a decision is initially made to see if (M3)=C1, i.e., whether a value C1 representing the absence of any correction is stored in the correction value save memory M3. If no correction is required, an exit is made through YES from this decision block, causing the display 27 to erase the symbol "+−". If a correction is required, an exit is made through NO from the decision of (M3)=C1, followed by the display of the symbol "+−".

The program then returns to the flowchart shown in FIG. 16 wherein spotwise brightness value BV is initially entered through input port I1 in the similar manner as the entry of various photographing information such as exposure period value TV, for storage in a memory MB. An Apex calculation for {(MB)+(M2)−(M5)} then takes place using the spotwise brightness value BV in the memory MB, the film speed value SV in the memory M2 and the stop-down value ΔAV in the memory M5. The result of the calculation or exposure period value TV is stored in a scanning point display memory MT. Since the spotwise brightness value (MB)=BV represents an amount of light which has passed through the open aperture, we have, representing the brightness of an object being photographed by $BV_0$, $$TV = BV_0 + SV - AV \tag{1}$$

$$BV = BV_0 - AVO \tag{2}$$

On the other hand, we have $$AV = AVO + \Delta AV \tag{3}$$

Substitution of the equations (2) and (3) into the equation (1) yields:

$$TV = BV + SV - \Delta AV \tag{4}$$

The exposure period value TV (MT) is displayed in a scanning point form by the display 27 as indicated in FIG. 5. Thus, an exposure period value (MT) corresponding to the magnitude of the spotwise brightness which is being currently determined is displayed as a point, which moves to the left or to the right, as indicated by a double headed arrow, as the camera is moved or the brightness of an object being photographed changes.

Figure 19:
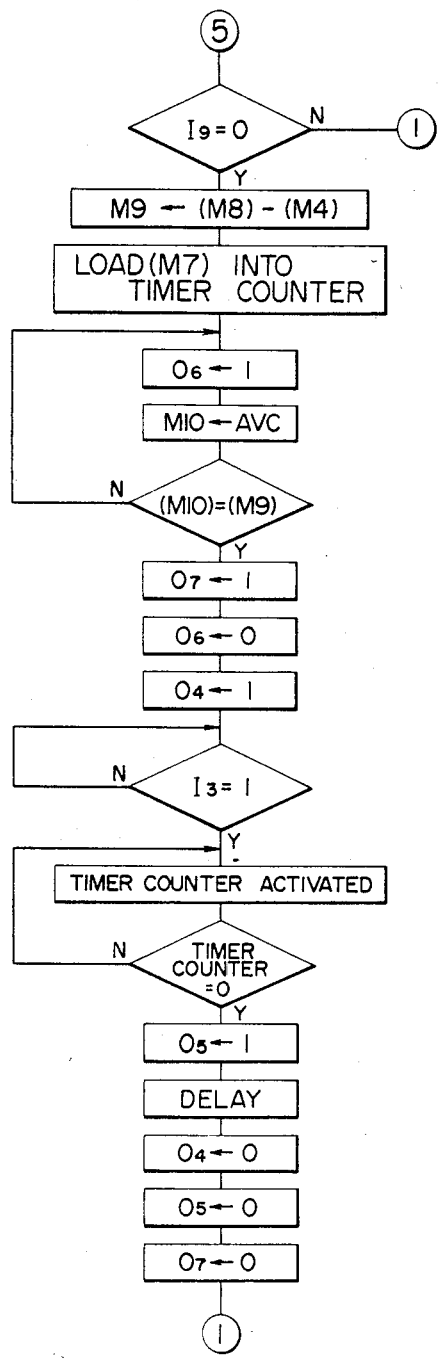

After the scanning point display, the preset aperture value (M6) stored in the memory M6 is transferred to an aperture value save memory M8, thereafter making an exit through ⑤—⑤ to branch to an exposure control flowchart shown in FIG. 19. In the flowchart of FIG. 19, it is initially determined if a shutter release has taken place by seeing if I9=0. If no shutter release has taken place, an exit is made from this decision block through NO, returning to the mode determining flowchart of FIG. 15 through ①—①, and an exit is made through YES from a decision block I6=0, then transferring to the flowchart for A.A mode shown in FIG. 16 through ②—②.

If it is assumed that the spotwise entry switch SW1 is now turned on for the first time, an exit is made through YES from the decision block of I4=0, followed by a decision to see if (MS)=0. The spotwise entry detecting flag MS initially remains at "0", whereby an exit is made through YES therefrom, transferring to a subroutine SUB3 where a memory MN and a flag MS are updated. Thus referring to FIG. 22, a calculation is initially made for {(MN)+1}, and the result of calculation is fed to the memory MN. An exit is made through NO from a decision block of (MN)=11, followed by setting the flag MS to "1" and storing the value of spotwise brightness which is being currently determined in a memory MBn. The character "n" in the designation of memory MBn has a one-to-one correspondence to the number of spotwise entries (MN), whereby the memory MBn stores a value representing an amount of light which passes through the open aperture of the lens during each spotwise entry, namely, the spotwise brightness value BV. The program then returns to the flowchart shown in FIG. 16, and returns to the mode determining flowchart shown in FIG. 15 through ①—①.

Figure 6:
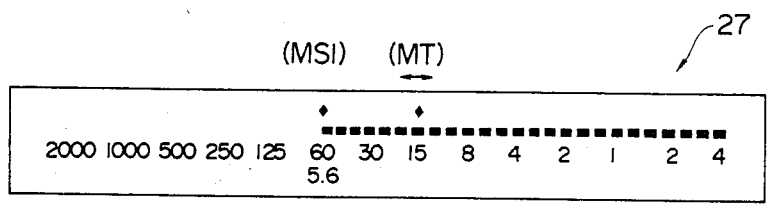

Having passed through the subroutine SUB3 once results in (MS)=1 and (MN)=1. Consequently, during the next pass, an exit is made through NO from the decision blocks of (MS)=0 and (MN)=0, thus transferring to the subroutine SUB1. Then various photographing information is stored in the memories M1 to M6 (see FIG. 20), and an Apex calculation for {(MBn)+(M2)−(M5)} is made using the spotwise brightness value BV in the memory MBn, the film speed value SV in the memory M2 and the preset stop-down value ΔAV in the memory M5. The result of calculation (TV) is stored in a point display memory MSn. Subsequently the exposure period value TV (MSn) determined by the described calculation is displayed in a point form by the display 27 (see FIG. 6). Subsequently, an arithmetic mean of exposure period values TV's stored in the memory MSn for n=1 to "n" is derived, and is added with a correction value CV stored in the memory M3 to derive $$\left\{ \sum_{n=1}^{N} (MSn)N + (M3) \right\},$$

which is stored in an exposure period save memory M7, and which is then displayed in a bar form by the display 27, in a manner illustrated in FIG. 6.

Specifically, in FIG. 6, the point, located left-most and indicating 1/60 second, represents the exposure period value (MSn) stored in the memory MSn, and is a fixed display. Since n=1 now, only one point for (MS1) is displayed. If the correction value CV is equal to 0, the bar representing the exposure period value (M7) stored in a memory M7 extends to a location which coincides with the point display (MS1). The subroutine SUB1 follows the bar display, and is followed by the display of a preset aperture value (M6) in terms of numerals. Then follows the subroutine SUB2, and the spotwise brightness value BV is stored in the memory MB. Subsequently, an Apex calculation for {(MB)+(M2)−(M5)} is made, with the result (TV) being stored in a memory MT. The resulting exposure period value (MT) is then displayed in a scanning point form, which is shown in FIG. 6 by a point located right-most. This point moves to the left or right across the display 27 in accordance with the brightness of an object being photographed.

When the spotwise entry switch SW1 is once turned on and is maintained on, an exit is made through YES from the decision block of I4=0, FIG. 16 and an exit is made through NO from the decision block of (MS)=0 and hence the subroutine SUB3 is not entered. An exit is made through NO from the decision block of (MN)=0 and accordingly the display 27 produces a display as illustrated in FIG. 6. If the entry switch SW1 is now turned off, an exit is made through NO from the decision block of I4=0, whereby the spotwise entry detecting flag MS is initialized to "0". Consequently, when the entry switch SW1 is subsequently turned on again, the program makes an exit through YES from the decision block of I4=0 and also through YES from the decision block of (MS)=0, transferring to the subroutine SUB3. In the subroutine SUB3 shown in FIG. 22, "2" is stored in the number of spotwise entries memory MN as a result of the calculation of {(MN)+1}. Then an exit is made through NO from the decision block of (MN)=11, setting the flag MS to "1", storing the spotwise brightness value BV in the memory MBn (n=2). Then the program returns to the flowchart of FIG. 16 and thence to the mode determining flowchart shown in FIG. 15 through ①—①.

Figure 7:
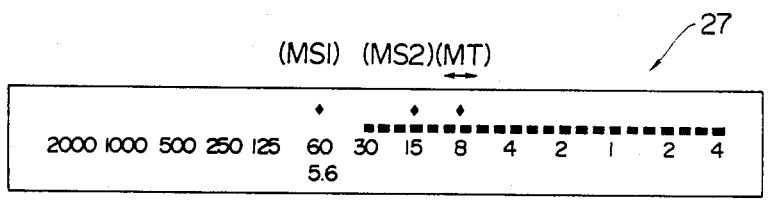
Figure 8:
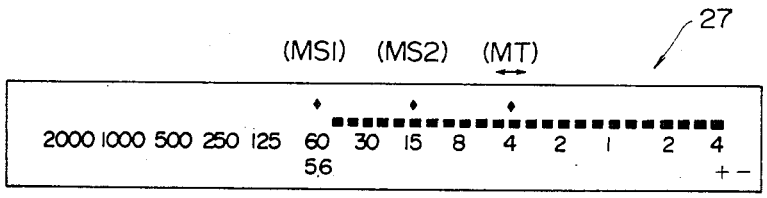

Accordingly, during the subsequent portion of the program, an exit is made through NO from the decision blocks of (MS)=0 and (MN)=0, transferring to the subroutine SUB1. An Apex calculation for {(MBn)+(M2)−(M5)} is made, and the result (MSn) is displayed in a point form. Since n=2 at this time, the content (MS2) is displayed in a point form as shown in FIGS. 7 and 8. Then an arithmetic mean of exposure period values TV's for $$\left\{ \sum_{n=1}^{N} (MSn)/N + (M3) \right\}$$

is made and stored in the exposure period save memory M7, the content of which is displayed in a bar form by the display 27 as indicated in FIGS. 7 and 8. It is to be noted that the exposure period value (M7) depends on whether the correction value CV in the memory M3 is or is not equal to C1. If (M3)≠C1, an exit is made through NO from the decision block of (M3)=C1 during the subroutine SUB2, and hence the symbol "+−" is displayed as indicated in FIG. 8.

In this manner, the content (MN) of the number of spotwise entries memory MN is incremented by one each time the spotwise entry switch SW1 is turned on when a user operates the spotwise entry button. Each time a fresh spotwise brightness value is entered, an Apex calculation for {(MBn)+(M2)−(M5)} for the exposure period corresponding to each spotwise brightness is repeated, and each exposure period is stored in the point display memory MSn (n=1 to N), with the exposure period value (MSn) being displayed in a point form by the display 27. Subsequently, an arithmetic mean of individual spotwise brightness values is made, and a correction value is added thereto to derive a value for $$\left\{ \sum_{n=1}^{N} (MSn)N + (M3) \right\},$$

which is then stored in the exposure period save memory M7 and its content (M7) displayed in a bar form by the display 27. Subsequently, as a spotwise brightness value which is being currently determined is entered, a corresponding exposure period value (MT) is displayed in a scanning point form, which moves if the camera is moved or the brightness of an object being photographed changes, thus enabling its distinction from a point display for the exposure period value (MSn) which corresponds to spotwise brightness value which has already been entered. The spotwise entry can be continued until the content (MN) of the number of spotwise entries memory MN becomes equal to "10", thus allowing a point display of an exposure period corresponding to up to ten spotwise brightness values (MS1) to (MS10) and a bar display of a corresponding arithmetic mean.

Assuming that (MN)=10 and the spotwise entry switch SW1 is turned on to effect an eleventh spotwise entry, an exit is made through YES from the decision block of I4=0 and through YES from the decision block of (MS)=0, transferring then to the subroutine SUB3 in which {(MN)+1}=1 is stored in the memory MN. Hence, an exit is made through YES from the decision block of (MN)=11, whereby a calculation for {(MN)−10}=1 is made, which is then stored in the memory MN. In other words, the eleventh spotwise entry results in (MN)=1. Subsequently, a latest spotwise brightness value BV is stored in a brightness value save memory MB1 which has a one-to-one correspondence to the number of spotwise entries (MN)=1. Accordingly, during the subsequent portion of the program, the exposure period value of the memory MS1, (MS1), is updated, and the updated exposure period value (MS1) is displayed in a point form. During a calculation for $$\left\{ \sum_{n=1}^{N} (MSn)N + (M3) \right\},$$

an arithmetic mean is derived using the updated exposure period value (MS1), with the result stored in the memory M7 and displayed in a bar form. During a twelfth and a subsequent spotwise entry, a similar operation is performed, and an exposure period value corresponding to an old brightness value is replaced by an exposure period value which corresponds to a latest spotwise brightness value, thus updating the point display and the bar display.

Figure 15:
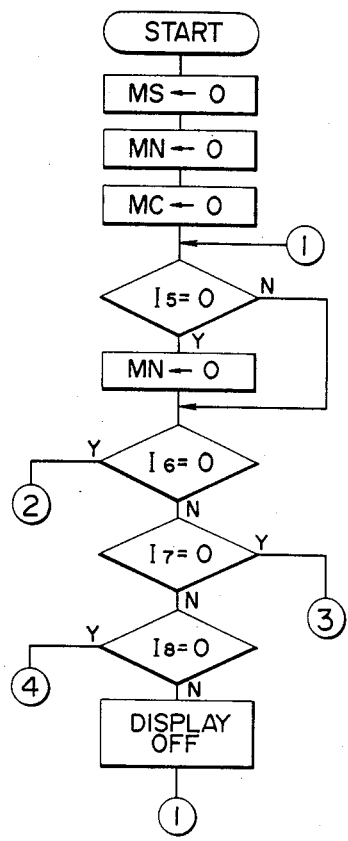
FIGS. 15 to 22 are flowcharts of various programs which may be performed by the microcomputer shown in FIG. 4.

When the clear button is depressed to turn the clear switch SW2 on, an exit is made through YES from the decision block of I5=0 in the mode determining flowchart of FIG. 15. Accordingly, "0" is stored in the number of spotwise entries memory MN, thus initializing it. Hence, when an exit is made through NO from the decision block of I4=0 in the flowchart of FIG. 16 subsequently, the spotwise entry detecting flag MS is also initialized, followed by an exit from the decision block of (MN)=0 through YES. Hence, the point display for (MSn) and the bar display for (M7) disappear from the display 27 while only the display of the preset aperture value (M6) and the point display of an exposure period value (MT) corresponding to a spotwise brightness value which is being currently determined remain (see FIG. 5).

Subsequently, when the release switch SW4 is turned on in response to the depression of the shutter release button, an exit is made through YES from a decision block of I9=0 in the exposure control flowchart shown in FIG. 19. An Apex calculation for {(M8)−(M4)} is made, with its result being stored in a stop-down value save memory M9. Since a preset aperture value (M6)=AVO+ΔAV is stored in the memory M8 and the open aperture value AVO is stored in the memory M4, it follows that a preset stop-down value ΔAV from the open aperture which is established by a rotation of the diaphragm ring 1 is stored in the memory M9. Thus the exposure period value (M7) is loaded into a timer counter. Then follows a change of the output port O6 to "1", which activates the diaphragm drive circuit 47. Thus, the coil 7 of the electromagnet Mg3 is energized, causing the diaphragm blade drive ring 6 to rotate, thus rotating the diaphragm blades 9 to effect a stop-down. As a result of such stop-down, the variable resistor RV7 produces an actual aperture change value AVC, which is then stored in a memory M10. It is to be understood that the stop-down operation is performed until (M10)=(M9), whereupon an exit is made from this decision block through YES. Then the output port 07 changes to "1". This activates the diaphragm halt circuit 48, and hence the electromagnet Mg4 is energized to hold the mating member 10 attracted thereto, thus bringing the mating member 10 into engagement with the gear 6b on the diaphragm blade drive ring 6 to halt the rotation of the latter. In this manner, the stop-down operation ceases at a point where the equality (M10)=(M9) prevails. Then the output port O6 changes to "0", which deactivates the diaphragm drive circuit 47, deenergizing the coil 7 of the electromagnet Mg3. Subsequently, the output port O4 changes to "1" to activate the first shutter blind drive circuit 45, whereupon the electromagnet Mg1 which has been constraining the first shutter blind is energized, releasing the first blind for running. Then a decision is made to see if I3=1.

As the first shutter blind begins running, the trigger switch SW5 in the trigger delay circuit is opened, whereby there occurs a current flow through the capacitor C0 and variable resistor RV9. As a result, the voltage at the inverting input terminal is higher than the voltage at the non-inverting input terminal of the comparator A6 until the capacitor C0 becomes charged, and the input port I3 remains at "0". After a given delay time determined by the values of the resistors R1, R2, capacitor C0 and variable resistor RV9, an output from the comparator A6 becomes inverted, changing the input port I3 to "1". This point in time represents the initiation of an exposure process. When an exit is made through YES from the decision block of I3=1, the timer counter mentioned above into which the exposure period value (M7) is loaded begins operating. This counter counts down until a count of "0" is reached, whereupon an exit is made through YES from a decision block of timer counter=0, changing the output port O5 to "1", which in turn activates the second shutter blind drive circuit 46. The operation of the drive circuit 46 energizes the electromagnet Mg2 which has been constraining the second shutter blind, thus allowing the second blind to begin running. This completes the entire exposure operation.

After a given time delay, the output ports O4, O5 and O7 are reset to "0", thus deactivating the first shutter blind drive circuit 45, the second shutter blind drive circuit 46 and the diaphragm halt circuit 48, thus returning to the initial condition. When the diaphragm halt circuit 48 is deactivated, the electromagnet Mg4 releases the mating member 10, which is therefore disengaged from the diaphragm blade drive ring 6, which then rotates to its initial position under the resilience of the spring 13, allowing the diaphragm blades 9 to rotate back to their fully open position (see FIG. 1). The program then returns to the mode determining flowchart of FIG. 15 through ①—①. However, unless the mode selection switch SW3 is operated, the programmed operation of the A.A mode is repeated.

Figure 9:
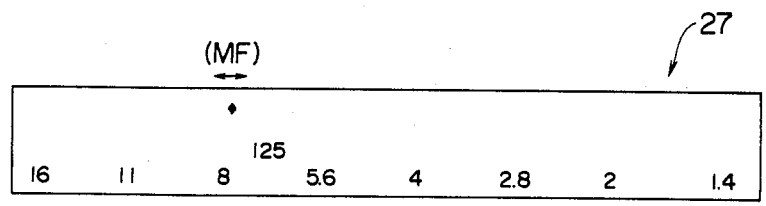
Figure 17:
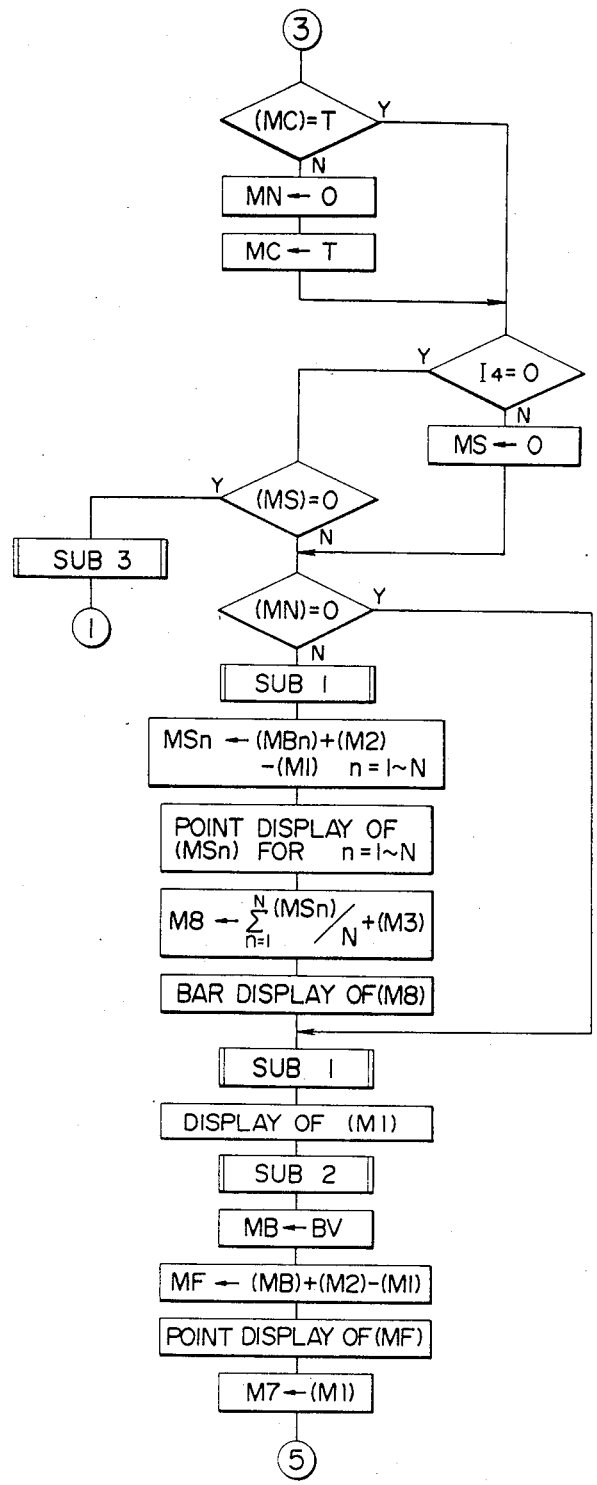

(B) When T.A (shutter priority automatic photographing) mode is selected:

When the mode selection switch SW3 is thrown to the contact b associated with the T.A mode, it will be seen that in the mode determining flowchart of FIG. 15, an exit is made through YES from the decision block of I7=0, thus branching to the flowchart for the T.A mode shown in FIG. 17 through 3—3. It should be noted that at the same time as the mode is switched to the T.A mode, the display 27 provides a basic display; thus aperture indices from "16" to "1.4" are displayed, as indicated in FIG. 9.

In the flowchart for the T.A mode, a decision is initially made to see if (MC)=T. "T" represents a numeric value which is specific to the T.A mode. If the content of the mode detecting memory MC, (MC), is not equal to "T", it is determined that the T.A mode has just been selected, making an exit through NO from the decision block of (MC)=T, and "0" is stored in the number of spotwise entries memory MN, followed by storing "T" in the memory MC. It will be seen that during a second and a subsequent pass, an exit is made through YES from the decision block of (MS)=T. Then follows a decision to see if I4=0. If the spotwise entry switch SW1 has not yet been turned on, an exit is made from this decision block, and "0" is stored in the spotwise entry detecting flag MS, whereupon an exit is made through NO from the decision block of (MN)=0 and then the program transfers to the subroutine SUB1. Various photographing information is entered during the subroutine SUB1, and then a display of (M1) is made. Since the exposure period value TV established by the variable resistor RV8 is stored in the memory M1, its content is displayed by the display 27. For example, if the established exposure period value (M1) is equal to "1/125 (S)", only the index "125" for the exposure period is displayed by the display 27, as shown in FIG. 9. Then follows the subroutine SUB2 (see FIG. 21) for displaying the correction, followed by storing the spotwise brightness value BV in the memory MB. Subsequently, using the spotwise brightness value BV in the memory MB, the film speed value SV in the memory M2 and the preset exposure period value TV in the memory M1, an Apex calculation is made for {(MB)+(M2)−(M1)}, and the resulting aperture value AV is stored in the scanning point display memory MF. The aperture value (MF) is displayed in a point form by the display 27, as indicated in FIG. 9. It will be understood that the point displayed moves to the left or the right in accordance with the spotwise brightness value which is being currently determined. Thereafter, the exposure period value (M1) is transferred into the exposure period save memory M7, and the program branches to the flowchart for the exposure control shown in FIG. 19 through ⑤—⑤.

In the flowchart of FIG. 19, if no shutter release has taken place, an exit is made through NO from the decision block of I9=0, and the program returns to the mode determining flowchart shown in FIG. 15 through ①— 1 . Then an exit is made through YES from a decision of I7=0, and the program transfers to the flowchart for the T.A mode shown in FIG. 17 through ③—③.

When the spotwise entry switch SW1 is now turned on, an exit is made through YES from the decision block of I4=0, followed by a decision to see if (MS)=0. When the entry switch SW1 is turned on for the first time, it is to be noted that "0" is stored in the spotwise entry detecting flag MS, and accordingly, an exit is made through YES from this decision block, subsequently transferring to the subroutine SUB3 to update the number of spotwise entries memory MN and the flag MS (see FIG. 22). After passing through the subroutine SUB3, we have (MN)=1, (MS)=1 and (MB1)=BV. Subsequent to the subroutine SUB3, the program returns to the mode determining flowchart shown in FIG. 15 through ①—①, and then enters the flowchart for the T.A mode through ③—③.

Figure 10:
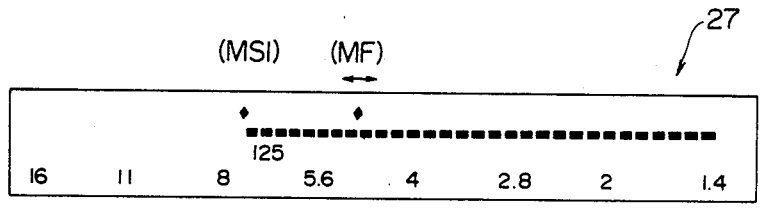

At this time, an exit is made through NO from both decision blocks of (MS)=0 and (MN)=0. Then follows the subroutine SUB1, and an Apex calculation for {(MBn)+(M2)−(M1)} is made. Since (MBn)=(MB1)=BV, M2=SV and (M1)=TV, the result of calculation $(BV+SV−TV)=AV$ is stored in the point display memory MSn=MS1. The aperture value (MS1) within this memory is displayed in a point form by the display 27 (see FIG. 10). Since the point display responsive to the spotwise entry is for a single value (MS1), the calculation of an arithmetic mean which follows, or $$\left\{ \sum_{n=1}^{N} (MSn)N + (M3) \right\},$$

is represented as {(MS1)+(M3)}, which is transferred to the aperture value save memory M8, the content (M8) of which is displayed in a bar form by the display 27. If no correction of exposure factors is made, it follows that the point display of the aperture value (MS1) will be coincident with the bar display of the aperture value (M8), as shown in FIG. 10. Subsequently, the subroutine SUB1 follows, and then the preset exposure period value (M1) is displayed in numeral form. Then follows the subroutine SUB2 where the spotwise brightness value BV is fed to the memory MB and an Apex calculation for {(MB)+(M2)−(M1)} is made, with the resulting aperture value (MF) being displayed in a scanning point form (see FIG. 10). Subsequently, the exposure period value (TV) stored in the memory M1 is transferred to the memory M7.

In the T.A mode, an exit is made through YES from the decision block of I4=0 and an exit is made through NO from each decision block of (MS)=0 and (MN)=0 in the similar manner as in the A.A mode as long as the spotwise entry switch SW1 is maintained on, so that the display 27 provides a display as illustrated in FIG. 10. If the entry switch SW1 is now turned off, an exit is made through NO from the decision block of I4=0, whereby the flag MS is initialized to "0", and an exit is made through NO from the decision block of (MN)=0, followed by the described programmed operation. When the entry switch SW1 is subsequently turned on again, an exit is made through YES from the decision block of I4=0 during this pass, and an exit is made through YES from the decision block of (MS)=0, thus transferring to the subroutine SUB3. Thus, during the subroutine SUB3, we have (MN)=2, (MS)=1 and (MB2)=BV.

Figure 11:
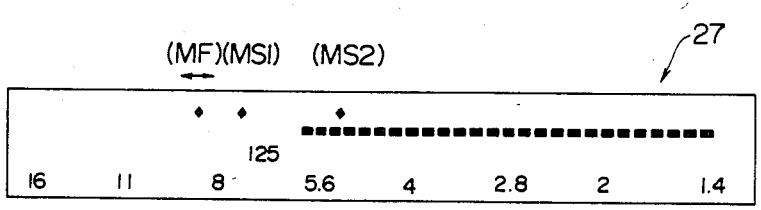

Subsequently, the program returns to the mode determining flowchart through ①—①, and then transfers to the flowchart shown in FIG. 17 through ③—③ where an exit is made through NO from each decision block of (MS)=0 and (MN)=0, followed by the subroutine SUB1. An Apex calculation for {(MB2)+(M2)−(M1)} is made, with the result AV being stored in the point display memory MS2. An aperture value AV within this memory which is equal to (MS2) is displayed in a point form by the display 27 (see FIG. 11). Thus, at this time, there are two point displays of (MS1) and (MS2) in response to the spotwise entries. An arithmetic mean of such aperture values is derived by an Apex calculation for $$\left\{ \sum_{n=1}^{N} (MSn)/N + (M3) \right\},$$

with the result of calculation being transferred to the aperture value save memory M8. The content (M8) of this memory is displayed in a bar form by the display 27. If no correction of exposure factors is made, an arithmetic mean of aperture values (MS1) and (MS2) which have been displayed in a point form corresponds to the aperture value (M8), which is displayed in a bar form, as shown in FIG. 11. If a correction of exposure factors is made, an exit is made through NO from the decision block of (M3)=C1 during the subroutine SUB2 (see FIG. 21), as mentioned previously in connection with the flowchart for the A.A mode, so that the display 27 displays the symbol "+−" (see FIG. 8), and the bar display produced includes a correction value.

Similarly, for each spotwise entry which is effected by a user depressing the spotwise entry button to turn the entry switch SW1 on and off, the number of spotwise entries (MN) is sequentially incremented by one, and individual brightness values BV of an object being photographed are sequentially stored in memories MB1, MB2, MB3, . . . MBn, . . . MBN. Each time a fresh spotwise brightness value is entered, an Apex calculation for an aperture value which corresponds to each brightness value (MBn) is repeated according to the formula {(MBn)+(M2)−(M1)}, with the result (MSn) being sequentially displayed in a point form by the display 27. Also an arithmetic mean of individual aperture values is derived, added with any correction value, which is formulated according to the formula $$\left\{ \sum_{n=1}^{N} (MSn)/N + (M3) \right\}$$

and is stored in the memory M8. The mean aperture value (M8) is displayed in a bar form by the display 27. In this manner, the spotwise entry can be repeated until the content of the number of spotwise entries memory MN, (MN), becomes equal to "10", thus allowing a point display of individual aperture values corresponding to up to ten spotwise brightness values (MS1) to (MS10) and also allowing a bar display of an arithmetic mean of such aperture values.

If the spotwise entry switch SW1 is turned on again to effect an eleventh spotwise entry when the entry switch SW1 has been turned on and off ten times to result in the number of spotwise entries (MN)=10, a spotwise brightness value of the eleventh entry is stored in the memory MB1, as mentioned above in connection with the programmed operation for the A.A mode. Thus, in response to the entry switch SW1 being turned on, an exit is made through YES from the decision block of I4=0, followed by the subroutine SUB3 (see FIG. 22) where (MN)=11 prevails. Hence, an exit is made through YES from this decision, whereupon it follows that (MN)=1. After setting (MS)=1, the brightness value of the current spotwise entry is stored in the memory MB1 which corresponds to (MS)=1. Accordingly, during a subsequent pass, an exit is made through NO from decision blocks of (MS)=0 and (MN)=0, and an aperture value corresponding to the spotwise brightness value of the eleventh entry is stored in the point display memory MS1, thus updating the aperture value in the memory MS1. As a result, the point display for the aperture value (MS1) is updated to a new value which corresponds to the latest, eleventh spotwise brightness value. This results in updating a result of calculation for $$\left\{ \sum_{n=1}^{N} (MSn)/N + (M3) \right\}$$

or (M8), which is a mean aperture value (M8) to be displayed in a bar form. A similar operation is repeated for a twelfth and subsequent spotwise entry, and each time a fresh spotwise brightness value is entered, a corresponding aperture value is substituted for an old value while simultaneously updating the point display and the bar display.

When a spotwise brightness value is entered by turning the entry switch SW1 on and when it is desired to clear this value which is now entered, the clear button may be depressed to turn the clear switch SW2 on. When the clear switch SW2 is turned on, in the mode determining flowchart of FIG. 15, an exit is made through YES from the decision block of I5=0, as mentioned above in connection with the A.A mode, whereby the number of spotwise entries memory MN is initialized, resulting in (MN)=0. Accordingly, After transferring to the flowchart shown in FIG. 17, an exit is made through NO from the decision block of I4=0, whereupon the flag MS is also initialized and an exit is made through YES from the decision block of (MN)=0. Accordingly, the point display for (MSn) and the bar display for (M8) disappear from the display 27, leaving the display of the preset exposure period (M1) and the point display of an aperture value (MF) corresponding to the spotwise brightness value which is being currently determined (see FIG. 9).

The depression of the shutter release button subsequent to the spotwise entry in the T.A mode causes the release switch SW4 to be turned on, whereupon in the exposure control flowchart shown in FIG. 19, an exit is made through YES from the decision block of I9=0, and an Apex calculation is made for {(M8)−(M4)}, with the result of calculation being stored in a stop-down save memory M9. Thus, the memory M9 stores a stop-down value from an open aperture which is required to control the diaphragm aperture. Subsequently, the preset exposure period value (M1) which is transferred to the memory M7 is loaded into a timer counter. The output port O6 is then set to "1", whereupon the diaphragm drive circuit 47 is activated, energizing the coil 7 of the electromagnet Mg3, causing the diaphragm blade drive ring 6 to rotate, which in turn causes diaphragm blades 9 to rotate, thus achieving a stop-down. During the actual stop-down operation, the variable resistor RV7 changes to provide an actual aperture change value AVC which is then stored in a memory M10. The diaphragm blade drive ring 6 continues to rotate against the resilience of the spring 13, as a result of the energization of the coil 7 until the equality (M10)=(M9) applies, thus reducing the diaphragm aperture. When (M10)=(M9) is reached, an exit is made through YES from this decision block, setting the output port O7 to "1" and activating the diaphragm halt circuit 48. As the diaphragm halt circuit 48 is activated, the electromagnet Mg4 is energized to hold the mating member 10 attracted thereto, which in turn acts to halt the rotation of the drive ring 6. The output port O6 is then reset to "0", thus deactuating the diaphragm drive circuit 47, and when the output port O4 is set to "1", the first shutter blind drive circuit 45 is actuated, causing the electromagnet Mg1 to release the first shutter blind from constraint for running.

A decision is then made to see if I3=1. Thus, the timer counter begins to operate when the output from the comparator A6 is inverted to provide I3=1 (beginning of exposure) at a given time delay after the trigger switch SW5 is turned off as a result of the initiation of running of the first blind. The exposure period value (M7)=(M1) which is loaded into the timer counter is counted down until a count of "0" is reached, whereupon the output port O5 is set to "1", thereby activating the second shutter blind drive circuit 46. This energizes the electromagnet Mg2 to release the constraint applied to the second blind, which therefore begins to run. This completes the exposure operation in the T.A mode. Thereafter, at a given time interval, the output ports O4, O5 and O7 are reset to "0", respectively, causing the first shutter blind drive circuit 45, the second shutter blind drive circuit 46 and the diaphragm halt circuit 48 to return to their deactivated condition. The program then returns to the mode determining flowchart shown in FIG. 15 through ①—①. Hence, the described programmed operation in the T.A mode is repeated unless the mode selection switch SW3 is changed.

Figure 12:
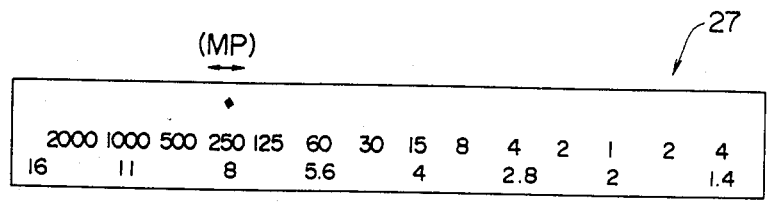
Figure 18:
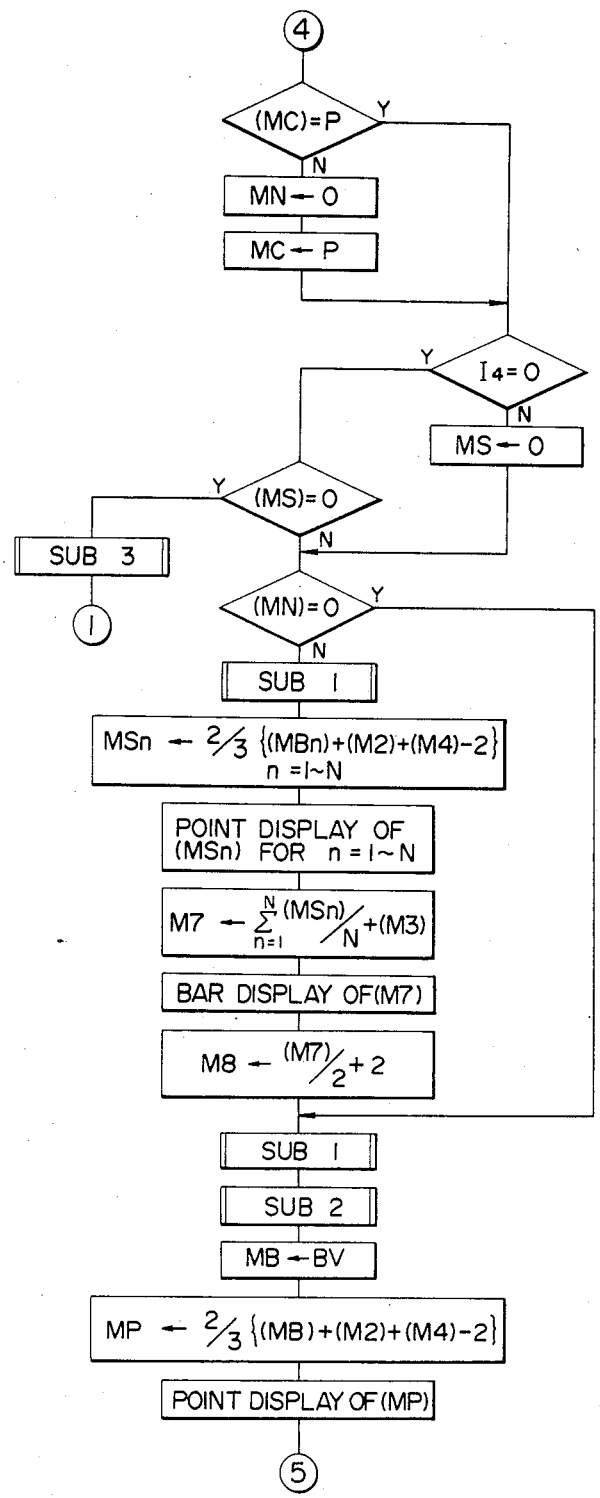
Figure 23:
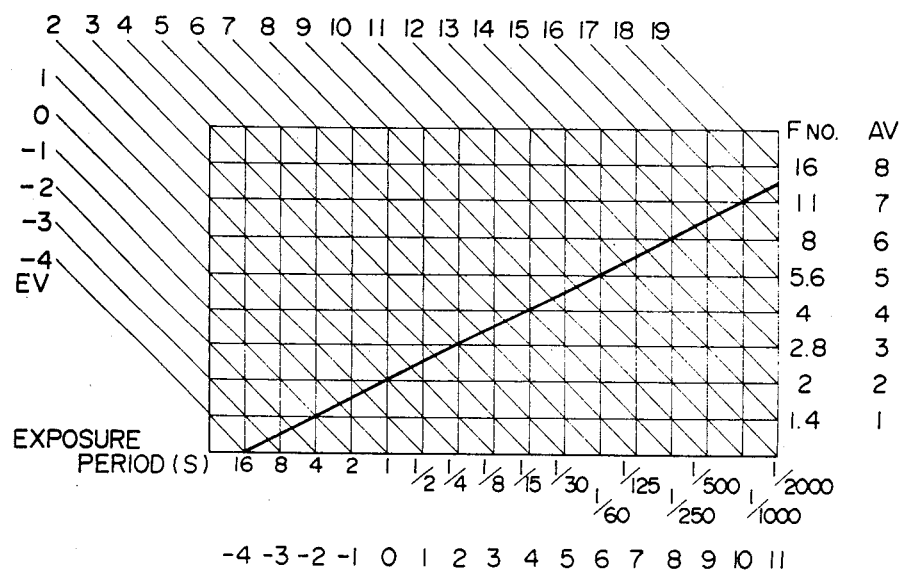
FIG. 23 graphically shows a diagram representing a programmed response during a programmed automatic photographing mode.

(C) When P.A (programmed automatic photographing) mode is selected:

When the mode selection switch SW3 is thrown to engage the contact c for the P.A mode, it will be seen that in the mode determining flowchart of FIG. 15, an exit is made through YES from a decision block of I8=0, and the program branches to the flowchart for P.A mode shown in FIG. 18 through ④—④. At the same time as the selection switch is thrown to select the P.A mode, the display 27 provides a basic display, displaying aperture indices from "16" to "1.4" and exposure period indices from "2000" to "4", as shown in FIG. 12. It is to be understood that those aperture indices and exposure period indices which satisfy a programmed characteristic curve shown in FIG. 23 are displayed in combination.

In the flowchart for the P.A mode, a decision is initially made to see if (MC)=P. "P" is a numerical value which is specific to the P.A mode. If the P.A mode is now selected for the first time, an exit is made through NO from the decision block of (MC)=P. The number of spotwise entries memory MN is initialized, followed by storing 'P' in a mode detecting memory MC. When "P" is stored in the memory MC, an exit from the decision block of (MC)=P is made through YES during a second and subsequent pass. Then follows a decision to see if I4=0. If the spotwise entry switch SW1 has not been turned on until this time, an exit is made through NO from this decision block, followed by an initialization of (MS)=0. Then, an exit is made through YES from the decision block of (MN)=0, and then follows the subroutines SUB1 and SUB2. A spotwise brightness value BV is fed to the memory MB, and utilizing the spotwise brightness value BV in the memory MB, the film speed value SV in a memory M2 and the open aperture value AVO in the memory M4, an Apex calculation is made for $[\frac{2}{3}\{(MB)+(M2)+(M4)-2\}]$. As a result of such calculation, an exposure period value TV is fed to a scanning point display memory MP.

Considering the formula for the above calculation, since the spotwise brightness value (MB)=BV represents an amount of light which has passed through the open aperture, it will be seen that representing the brightness value of an object being photographed by $BV_0$, we have from the equation (1)

$$BV_0+SV=TV+AV=EV \tag{1}'$$

Substitution of this equation into the equation (2) yields:

$$BV+SV+AVO=TV+AV=EV \tag{5}$$

It is to be noted that a programmed characteristic curve shown in FIG. 23 establishes a relationship between an exposure period value TV and an aperture value AV such that $$TV=2(AV-2) \tag{6}$$

Substitution of the equation (5) into the equation (6) yields:

$$\begin{aligned}TV &= \tfrac{2}{3}(EV - 2) \\ &= \tfrac{2}{3}(BV + SV + AVO - 2)\end{aligned} \tag{7}$$

This explains the formula for the Apex calculation. Then the display 27 displays the exposure period value TV(MP) thus determined in a point form as shown in FIG. 12. It will be noted that the point display for the exposure period value (MP) shifts as indicated by a double headed arrow if the camera is moved or the brightness of an object being photographed changes. Subsequently, the program branches to the exposure control flowchart shown in FIG. 19 through ⑤—⑤. In the flowchart of FIG. 19, if a shutter release has not yet taken place, an exit is made through NO from the decision block of I9=0, returning to the mode determining flowchart of FIG. 15 through ①—①. After making an exit through YES from the decision block of I8=0, the program then transfers to the flowchart for P.A mode shown in FIG. 18 through ④—④.

When the spotwise entry switch SW1 is then turned on, an exit is made through YES from the decision block of I4=0 if the switch SW1 is turned on for the first time, as mentioned above in connection with the A.A mode and the T.A mode. Subsequently, an exit is made through YES from the decision block of (MS)=0, thus entering the subroutine SUB3 where the number of spotwise entries (MN) is updated, the flag MS is set, and the spotwise brightness value BV is saved in the memory MBn which is in one-to-one correspondence to the number of spotwise entries (MN). Subsequently, the program returns to the mode determining flowchart shown in FIG. 15 through ①—①.

During a next pass, after making an exit through YES from the decision block of I4=0, an exit is made through NO from the respective decision blocks of (MS)=0 and (MN)=0. When the entry switch SW1 is turned off, an exit is made through NO from the decision block of I4=0, and the flag MS is reset to "0". Hence, when the entry switch SW1 is turned on the next time, after making an exit through YES from the decision block of I4=0, an exit is made through YES from the decision block of (MS)=0, thus transferring to the subroutine SUB3 to update the number of spotwise entries (MN), to set the flag MS and to save the spotwise brightness value BV in the memory MBn. During a subsequent pass, an exit is made through NO again from the decision blocks of (MS)=0 and (MN)=0. It will be seen that an exit is made through NO from the decision block of (MN)=0 when the entry switch SW1 is turned on one or more times, and the display 27 provides a point display corresponding to the number of spotwise entries, in a manner similar to the A.A and T.A modes. Specifically, after making an exit through NO from the decision block of (MN)=0, the subroutine SUB1 is entered and an Apex calculation is made according to the formula [⅔{(MBn)+(M2)+(M4)−2}]. As a result of such calculation, an exposure period value TV is stored in the point display memory MSn. The formula described above is again defined by the programmed characteristic curve shown in FIG. 23. The exposure period value TV (MSn) thus determined is displayed in a point form by the display 27, as shown in FIGS. 13 and 14.

Figure 13:
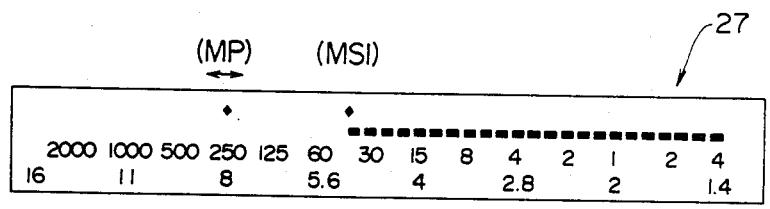
Figure 14:
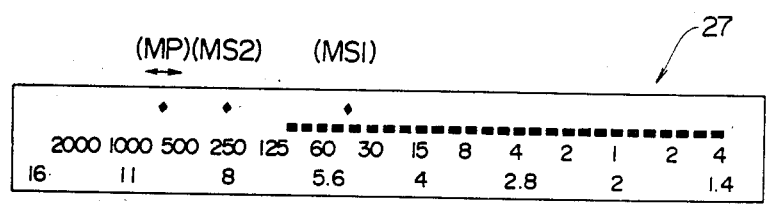

FIG. 13 shows the condition for (MN)=1, and only an exposure period value (MS1) which corresponds to a first spotwise brightness value is displayed in point form. FIG. 14 shows a condition for (MN)=2, and exposure period values (MS1) and (MS2) corresponding to first and a second spotwise brightness value are displayed in a point form. Subsequently, a calculation for an arithmetic mean is made according to the formula $$\left\{ \sum_{n=1}^{N} (MSn)N + (M3) \right\},$$

and a result of calculation is stored in the exposure period save memory M7, the content of which is displayed in bar form by the display 27. If no correction is made, it follows that for (MN)=1, both the point display and the bar display will indicate the same exposure period, as shown in FIG. 13 while for (MN)=2, the bar display will be an arithmetic mean of two exposure period values defined by the point displays, as indicated in FIG. 14. Then, an Apex calculation for {(M7)/2+2} is made, using the exposure period value (M7), and the result of calculation is stored in the aperture value save memory M8. It will be understood that this formula is defined by the following equation:

$$AV = TV/2 + 2 \tag{6}'$$

which is in turn derived from the equation (6) as established by the programmed characteristic curve shown in FIG. 23.

Until the number of spotwise entries (MN) reaches 10, a point display of an exposure period value (MSn) (n=1 to N) corresponding to each spotwise brightness value, as well as a bar display of an arithmetic mean (M7) of exposure period values, determined according to the formula established by the programmed characteristic curve are given. In addition, an aperture value (M8) which corresponds to the arithmetic mean (M7) is calculated. When the number of spotwise entries (MN) becomes equal to 11, a calculation is made for {(MN)−10} during the subroutine SUB3 in a similar manner to that mentioned above in connection with the A.A and T.A modes, and the result is stored in the memory MN. The then prevailing spotwise brightness value BV is stored in the memory MB1 which corresponds to (MN)=1.

In this manner, while the point display up to ten values is made corresponding to each memory MSn (n=1 to 10), when the number of spotwise entries exceeds 10, an exposure period value corresponding to the eleventh brightness value is stored in the point display memory MS1 which has been storing an exposure period value corresponding to the first spotwise brightness value, thus updating the exposure period value (MS1) in the memory MS1. Simultaneously, the point display therefor is updated to an exposure period value corresponding to the latest or eleventh brightness value. Consequently, the arithmetic mean of exposure period values (M7) is also updated and the bar display is based on this updated value. In addition, the aperture value (M8) is updated. The operation is repeated for each of twelfth and subsequent spotwise entries, an old exposure period value corresponding to an old spotwise brightness value being replaced by an exposure period value which corresponds to a latest spotwise brightness value, while concurrently updating a point display, a bar display and an aperture value.

When it is desired to clear a brightness value which is entered by operating the spotwise entry switch SW1, the clear switch SW2 may be turned on. As mentioned above in connection with the A.A and T.A modes above, in the mode determining flowchart of FIG. 15, an exit is made through YES from the decision block of I5=0, so that (MN)=0. Accordingly, in the flowchart of FIG. 18, an exit is made through YES from the decision block of (MN)=0, so that the point display for (MSn) and the bar display for (M7) disappear from the display 27, leaving only the scanning point display for the exposure period value (MP) corresponding to the spotwise brightness value which is being currently determined (see FIG. 12).

The depression of the shutter release button when a spotwise entry is made in the P.A mode causes the release switch SW4 to be turned on, whereby in the exposure control flowchart shown in FIG. 19, an exit is made through YES from the decision block of I9=0, and an Apex calculation for {(M8)−(M4)} is made, with the result being stored in the stop-down save memory M9. Thus the memory M9 stores a stop-down value from the open aperture which is required to effect a diaphragm control. Subsequently, the exposure period value stored in the memory M7 is loaded into a timer counter. The output port O6 is then set to "1" to actuate the diaphragm drive circuit 47, whereby the diaphragm blade drive ring 6 rotates to effect a stop-down operation. During the actual stop-down operation, the variable resistor RV7 produces a changing value to provide an actual aperture change value AVC, which is stored in the memory M10. Upon reaching (M10)=(M9), an exit is made through YES from this decision block, and the output port O7 is set to "1" to actuate the diaphragm halt circuit 48, which energizes the electromagnet Mg4 to halt the rotation of the drive ring 6, thus terminating the stop-down operation.

After the output port O6 is reset, the output port O4 is set to "1", allowing the first shutter blind to begin running, whereby at a given time delay after the trigger switch SW5 is turned off, an exit is made through YES from the decision block of I3=1. The timer counter in which the exposure period value (M7) is loaded begins to count down from this time on (the initiation of the exposure process) until a count of "0" is reached, whereupon the output port O5 is set to "1", allowing the second blind to begin running. The running of the second blind completes the exposure operation in the P.A mode. At a given time interval thereafter, the output ports O4, O5 and O7 are reset, and the program returns to the mode determining flowchart shown in FIG. 15 through ①—①. Hence, the programmed operation in the P.A mode is repeated unless the mode selection switch SW3 is changed.

In each of the automatic photographing modes described above, an exposure period value or an aperture value which determines the exposure factors is determined by an arithmetic mean of exposure period values or aperture values which correspond to individual brightness values from multiple spots. However, it should be understood that as an alternative to an arithmetic mean, a root mean square or a particular exposure period value or aperture value which is offset from a maximum or minimum brightness value may be used.

In the embodiment described above, it has been assumed that up to ten spotwise brightness values can be simultaneously saved and the time sequence of entering ten spotwise brightness values is recycled. However, the number of such values which can be saved may be changed to any desired value, provided a corresponding memory capacity is provided.

Also it should be understood that use of the invention is not limited to a spotwise photometry mode, but the recycling storage of the present embodiment can be used with any other photometry mode such as an average photometry mode or a center concentrated photometry mode, for example. In such instance, it is necessary that the light receiving element PD which is used for the spotwise photometry be replaced by another or other elements which are adapted to effect an average photometry or a center concentrated photometry.

What is claimed is:
1. A photometric camera of the multiple spot photometry type comprising:
    photometric means in which photometry is effected by means of a single photoelectric transducer element;
    storage means having a plurality of storage locations for sequentially receiving information representing the brightness of an object being photographed at desired spots to be determined and for storing such information at different storage locations in said storage means;
    update means operative whenever the number of information from the photometric means is received reaches a given number to substitute the latest brightness information for the oldest information which has previously been received and stored in a sequential manner; and
    processing means for performing a given arithmetic operation utilizing the stored brightness information derived from the photometric means for exposure control or display.

2. A photographic camera according to claim 1 in which the photometric means further comprises a microcomputer for controlling receipt and storage of brightness information in said storage means.

3. A photographic camera according to claim 1 in which the update means and the processing means comprise a microcomputer.

4. A method for operating a photometry system for obtaining multiple spot photometry information for a photographing operation which system includes photometry means and storage means, control means for controlling the storage means and the photometry means in accordance with information received by the input means and a spot photometry operating member for initiating a spot photometry operation and a shutter operating member for initiating a photographing operation, said method comprising the steps of:
    storing each spot photometry value developed by said photometry means at different locations in said storage means responsive to each operation of the spot photometry operating member;
    calculating a control value utilizing the spot photometry values stored in aaid storage means responsive to the operation of the shutter operating member;
    maintaining a count of the number of spot photometry values stored in the storage means; and
    replacing the oldest spot photometry value in the storage means by the current spot photometry value generated by said photometry means responsive to the operation of the spot photometry operating member when the count of stored spot photometry values reaches a predetermined number.

5. The method of claim 4 wherein said system includes a clear operating member further comprising the step of clearing all of the spot photometry values stored in the storage means upon operation of a clear operating member.

6. The method of claim 4 in which the camera further includes display means comprising the step of:
    displaying the result of the aforementioned calculation in the display means.

7. The method of claim 4 wherein the step of performing a calculation further includes the step of producing an average value of the spot photometry values stored in the memory means.

8. The method of claim 4 further comprising the step of controlling the interval during which the shutter is open in accordance with the result of said calculation.

9. The method of claim 4 wherein the step of storing spot photometry values in the memory means further comprises the steps of providing the spot photometry value in analog form; and converting the spot photometry value into digital from prior to storing the spot photometry value in the memory means.

10. The method of claim 6 further comprising the steps of performing calculations for determining a desired shutter speed and aperture opening; and
displaying said desired values in the display means.

11. The method of claim 10 further comprising the step of displaying on the display means the number of spot photometry operations which have been performed.

12. The method of claim 4 in which the camera further includes display means for displaying data and fixed indicia representative of selected shutter speeds and selected lens openings and further comprising the steps df:
- displaying each stored brightness value in the form of a point on said display;
- calculating the average of said brightness values;
- determining the exposure period using the calculated average value; and
- displaying the calculated exposure period in the form of an elongated bar extending from one end of the display and with the other end positioned relative to said shutter speed indicia to identify the calculated shutter speed.

* * * * *

UNITED STATES PATENT AND TRADEMARK OFFICE
CERTIFICATE OF CORRECTION

PATENT NO. : 4,571,049
DATED : February 18, 1986
INVENTOR(S) : KATSUHIKO TAUNEFUJI and MASAFUMI YAMASAKI It is certified that error appears in the above-identified patent and that said Letters Patent is hereby corrected as shown below:

Column 13, line 48, change " "n" " to --"N"--;

Column 18, line 11, change "1" to --①--;

Column 20, line 53, change "After" to --after--; and

Column 28, line 2, change "df;" to --of:--.

Signed and Sealed this

Nineteenth Day of August 1986

[SEAL]

Attest:

DONALD J. QUIGG

Attesting Officer

Commissioner of Patents and Trademarks